E. A. FAUT.
AUTOMOBILE TRACTOR ATTACHMENT.
APPLICATION FILED OCT. 23, 1915. RENEWED MAR. 10, 1917.

1,222,750.  
Patented Apr. 17, 1917.

Witnesses  
Eugene A. Faut,  
Inventor

UNITED STATES PATENT OFFICE.

EUGENE A. FAUT, OF JOLIET, ILLINOIS.

AUTOMOBILE TRACTOR ATTACHMENT.

1,222,750. Specification of Letters Patent. Patented Apr. 17, 1917.

Application filed October 23, 1915, Serial No. 57,440. Renewed March 10, 1917. Serial No. 154,008.

*To all whom it may concern:*

Be it known that I, EUGENE A. FAUT, a citizen of the United States, residing at Joliet, Will county, Illinois, have invented an Automobile Tractor Attachment, of which the following is a specification.

My invention is an apparatus that can be attached to any automobile, with such variations as may be necessary to conform to the various sizes and forms of automobiles, and the objects of my invention are to convert an automobile into a tractor by reducing its speed by means of certain gearing and other devices so that it can be used for plowing and other heavy draft work.

I attain these objects by the mechanism illustrated in the accompanying drawing, in which—

Figure 1:
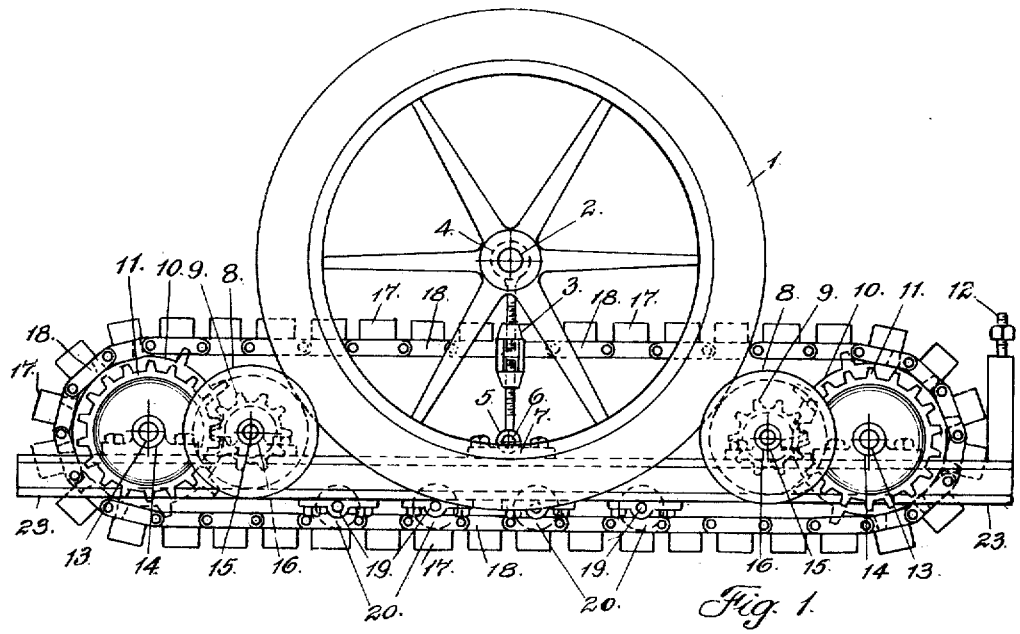
Figure 2:
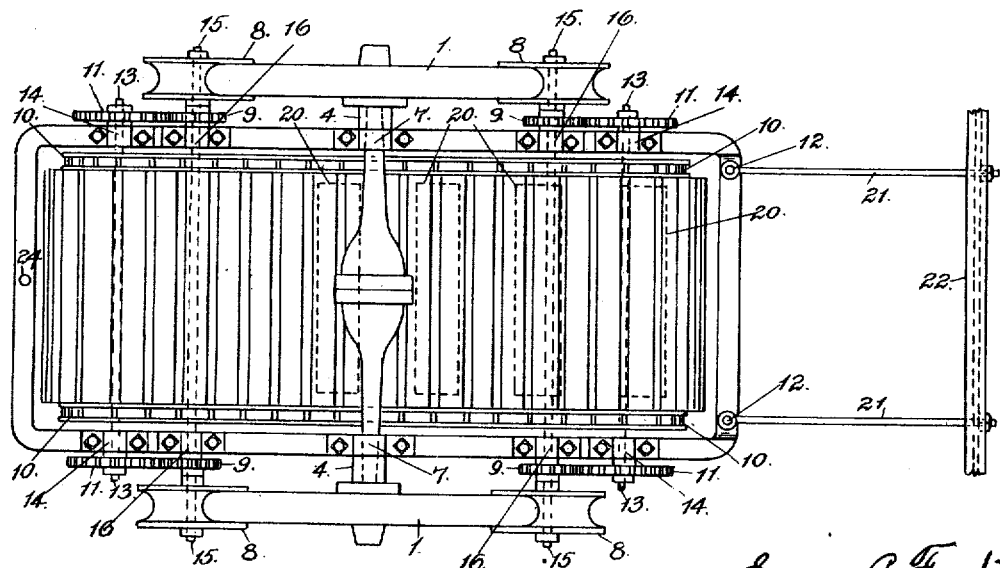

Figure 1 is a side view and Fig. 2, a top view of the apparatus.

In the above figures, all parts of the automobile except the rear wheels and the two axles are removed.

The rear wheels 1 are backed on to the attachment frame until they rest on and between the spools 8. The eye-bolt 4 is connected to the axle 2, and the eye-bolt 5 is connected to the trunnion 6 which is fastened to the bracket 7. Said eye-bolts are connected by the turn buckle 3 which regulates the distance between the frame 23 and the axle 2. The shafts 13 and 15 journal in journal boxes 14 and 16. The driving pinions 9 on shaft 15 mesh into the gear wheels 11 on shaft 13, which rotate the sprocket wheels 10 on same shaft, which, in turn, engage and rotate the link belts 18, which have the wooden slats 17 fastened to them, said slats extending across from one of said belts to the other belt. The bolts 12 are to connect the frame 23 to the front axle 22, by means of the rods 21.

The rollers 20 are fastened to the shafts 19. Plows or objects to be pulled or hauled by this tractor attachment, are to be connected to the same at the slot 24 in the frame 23.

It can be seen that the rear automobile wheels engage the spools 8 by means of which the pinions 9 are rotated and engage gears 11, which in turn revolve sprocket-wheels 10, which moves sprocket chains or link-belts 18 as well as the slats fastened across from one to the other chain or belt, thus revolving the same over the ground surface and moving the attachment apparatus at a speed reduced by the gearing connected to the frame of the attachment from what the speed of the automobile would be without the attachment. In other words, converting an automobile into a tractor to pull plows or other objects at about the speed of walking horses.

What I claim, is—

1. An automobile tractor attachment, comprising, a frame piece connected to the front axle of the automobile; concaved friction wheels on each side of said frame piece fastened to shafts passing through each side of said frame piece and journaling in boxes fastened to the sides of said frame piece, said friction wheels being engaged by and revolved by the motion of the rear automobile wheels; driving pinions fastened to said shaft, one on each side between the frame piece and one of said friction wheels; sprocket wheels fastened to shafts journaling in boxes in each side of said frame piece, each of said sprocket wheels engaging one of said driving pinions; link belts on each side of said frame piece having slats each end of which are fastened to one of said link belts, the said belts and connecting slats thus forming an oblong revolving apparatus underneath the axle of and nearly filling the space between, the rear wheels of an automobile, by means of which the combination is moved at about the speed of walking horses, all substantially as illustrated and described.

2. An automobile tractor attachment, comprising, an oblong revolving apparatus connected to the front axle of the automobile, the body of the apparatus to be placed under the rear part of the automobile; two spool-shaped wheels connected to said apparatus in such positions as to be engaged by the rear wheels of the automobile, the revolving motion of the automobile wheels imparting revolving motion to the said spool-shaped wheels, and the latter imparting motion to said apparatus; gearing means to reduce the revolving speed of said apparatus below that of said spool-shaped wheels, so as to adapt it to be connected to and to operate plows.

EUGENE A. FAUT.

Witnesses:
JOHN M. WOLFRUM,
CLAUDE S. MILLER.

Copies of this patent may be obtained for five cents each, by addressing the "Commissioner of Patents, Washington, D. C."